United States Patent [19]
Hughes

[11] 3,868,688
[45] Feb. 25, 1975

[54] HIGH SPEED VIDEO TRACK LOOP

[75] Inventor: Richard Smith Hughes, Ridgecrest, Calif.

[73] Assignee: The United States of America as represented by the Secretary of the Navy, Washington, D.C.

[22] Filed: June 21, 1973

[21] Appl. No.: 372,441

[52] U.S. Cl. ............ 343/16 M, 343/7 A, 343/113 R
[51] Int. Cl. .............................................. G01s 9/22
[58] Field of Search .............. 343/7 A, 16 M, 113 R

[56] References Cited
UNITED STATES PATENTS

| | | |
|---|---|---|
| 3,396,395 | 8/1968 | Ball et al. ........................ 343/113 R |
| 3,430,235 | 2/1969 | Bender et al. ...................... 343/7 A |
| 3,487,405 | 12/1969 | Molho et al. ...................... 343/7 A |
| 3,555,547 | 1/1971 | Arvidsson .......................... 343/7 A |
| 3,599,208 | 8/1971 | Nelson ............................ 343/16 M |

Primary Examiner—T. H. Tubbesing
Assistant Examiner—G. E. Montone
Attorney, Agent, or Firm—R. S. Sciascia; Roy Miller; Robert W. Adams

[57] ABSTRACT

A high speed video tracking system for tracking varying amplitude video pulses, wherein the video tracking loop has a direct coupled gated comparator, limiting amplifier, and gated, high speed, zero offset integrator.

7 Claims, 7 Drawing Figures

HIGH SPEED VIDEO TRACK LOOP

BACKGROUND OF THE INVENTION

In the radar field monopulse radar receivers require a pulse tracking loop for determining the direction of arrival of the incoming pulse train. All previous systems are plagued with deficiencies. The deficiencies inherent in most such systems are their inability to track at a high degree of accuracy at the high speed required by the new technologies. Also, all known prior approches in the field of radar pulse trackers are large systems with complex and complicated circuitry.

The present invention provides an improved and simpler system that applies a new approach to provide high speed tracking of video range signals with the speed and high degree of accuracy required by the new technology. The novelty resides in the direct coupled gated comparator, limiting amplifier, and gated high speed, zero offset integrator; their configuration in the tracking loop; and, the implementation of the loop in a radar receiver system.

DESCRIPTION OF THE PREFERRED EMBODIMENT

Figure 1:
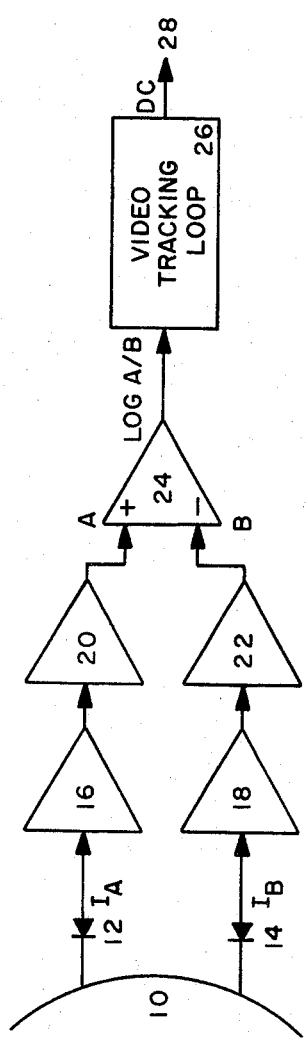
FIG. 1 is a block diagram of the basic monopulse radar direction finding system of the present invention showing the video tracking loop.

FIG. 1 shows the basic monopulse direction finder of the present invention having the novel video tracking loop 26. Radio frequency (RF) pulses are detected by antenna 10 and detected by detectors 12 and 14 providing currents $I_A$ and $I_B$, respectively. $I_A$ and $I_B$ represent the instaneous intensity of the incoming signal in the respective channels.

The pulses $I_A$ and $I_B$ are then logrithmically amplified by log amplifiers 16 and 18, and coupled to follow/hold circuits 20 and 22, respectively. Follow/hold circuits 20 and 22 operate to stretch the log amplified outputs, thereby enabling the video track loop 26, discussed below to perform adequately against even short RF input pulses.

The outputs of follow/hold circuits 20 and 22 are coupled to differencing amplifier 24. The output of differencing amplifier 24 is the difference between the output of follow/hold 20, i.e., log $I_A$ and the output of follow/hold 22, i.e., log $I_B$. The difference, therefore, is given by the expression log A/B. That is, the output of differencing amplifier 24, which indicates the direction of arrival of the incoming RF pulse train, is independent of intensity. The output is then coupled to, and processed by, video tracking loop 26.

It would appear that by stretching the log amplified outputs follow/hold circuits 20 and 22 would distort the logarithmic response. The log responses, however, are merely stretched in time without otherwise being modified. And, because the outputs of both log amplifiers 16 and 18 are stretched identically by matched follow/hold circuits 20 and 22, respectively, the relative characteristic of the outputs are maintained. As a result, the comparison made by differencing amplifier 24 provides an accurate indication of the comparison between the log amplified outputs.

Figure 2:
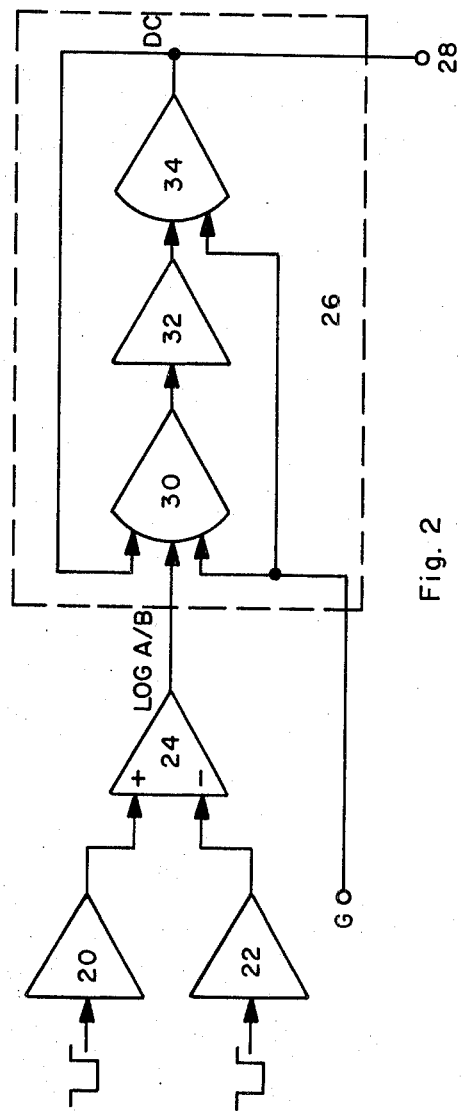
FIG. 2 is a block diagram showing the basic high speed video track loop and its components.

FIG. 2 shows the basic high speed video track loop 26 of the present invention. The output of differencing amplifier 24 is fed to gated comparator 30. Gated comparator 30 is an amplifier capable of comparing two voltage levels, either pulse or DC, on a given command. The output of the comparator is a function of the first input (from differencing amplifier 24) and the second input (the feed back signal from integrator 34), and has a width equal to the width of the gate pulse. For example, if the inputs are simultaneous and the first input is more positive than the second is negative, the output will occur during the gated period and will be equal to the positive difference between the two. The output of the gated comparator employed is dependent on the amplitude and polarity of its input from differencing amplifier 24, and on the DC output of the gated integrator 34. The gated comparator 30 operates only during the time gate pulse G is provided by a controllable gate signal source, not shown.

The output of gated comparator 30 may be coupled through optional limiting amplifier 32 to gated integrator 34. Limiting amplifier 32 is employed to slow the operation of the tracking loop down, if it so desired. To slow the operation down the maximum amplitude of limiting amplifier 32 is adjusted, which, in effect, operates limiting amplifier 32 as a clipper of the gated comparator's output. The track loop as disclosed herein is capable of nulling within 2 microseconds.

Integrator 34 is controlled by gate signal G, and operates only during the time it is gated by the external gate pulse. The same gate pulse G is coupled to both gated comparator 30 and gated integrator 34. As a result, the integrator processes only the result of those signals compared by the comparator during the gated period. The output of integrator 34 is a DC signal 28 which is fed back as the second input to gated comparator 30, and provided as the system output. Gated integrator 34 is disclosed and described in U.S. Patent Application Ser. No. 372,442, filed June 21, 1973, entitled High Speed Gated Video Integrator with Zero Offset, by Richard Smith Hughes.

FIG. 3–7 show schematic diagrams of the follow/hold, differencing amplifier, gated comparator, limiting amplifier, and gated integrator, respectively of an operative embodiment of the present invention.

The specific circuits of the figures and the following specific components are offered only as an example of one embodiment of the contemplated invention, and should not be considered to limit the extent of the invention in any way.

| SYMBOL | COMPONENTS | TYPE OR VALUE |
|---|---|---|
| 110 | Capacitor | 0.1 μf |
| 112 | Resistor | 5.11 KΩ |
| 114 | Transistor Pair | MD-918A |
| 116 | Transistor | 2 N-929 |
| 118 | Resistor | 1.5 KΩ |
| 120 | Resistor | 2 KΩ |
| 122 | Capacitor | 20 pf |
| 124 | Resistor | 5.11 KΩ |
| 126 | Capacitor | 0.1 μf |
| 128 | Transistor | 2 N-918 |
| 130 | Resistor | 1 KΩ |
| 132 | Resistor | 499Ω |
| 134, 136 | Capacitors | 0.1 μf |
| 138 | Resistor | 10 KΩ |
| 140 | Rectifier Pair | 1 N-916 |
| 142 | Resistor | 300 Ω |
| 144 | Transistor | 2 N-2222 |
| 146 | Resistor | 300 Ω |
| 148 | Resistor | 2 N-2412 |
| 150 | Transistor | 2 N-2412 |
| 152 | Resistor | 300 Ω |
| 154 | Resistor | 1 KΩ |
| 156 | Transistor Pair | MD-2369A |
| 158 | Resistor | 1 KΩ |
| 160 | Diode | 1 N-916 |
| 162 | Resistor | 10 Ω |
| 164 | Capacitor | 0.001 μf |
| 166 | Resistor | 5.11 KΩ |
| 168 | Variable Resistor | 1 KΩ + 500Ω |
| 170 | Field Effect Transistor | 2 N-2609 |
| 172 | Resistor | 2 KΩ |
| 174 | Transistor | 2 N-929 |
| 176 | Transistor | 2 N-429 |
| 178 | Resistor | 5 KΩ |
| 180 | Resistor | 5 KΩ |
| 182 | Capacitor | 51 pf |
| 184 | Resistor | 2 KΩ |
| 186 | Transistor | 2 N-2222 |
| 188 | Resistor | 1 KΩ |
| 210 | Capacitor | 1/35 μf |
| 212 | Resistor | 5.11 KΩ |
| 214 | Transistor Pair | MD-918 A |
| 216, 218 | Resistors | 499 Ω |
| 220 | Transistor | 2 N-929 |
| 222 | Resistor | 5.11 KΩ |
| 224 | Resistor | 1 KΩ |
| 226 | Variable Resistor | 5 KΩ |
| 228 | Resistor | 5.11 KΩ |
| 230 | Capacitor | 1/35 μf |
| 232 | Transistor | 2 N-2222 |
| 234 | Resistor | 5.11 KΩ |
| 310 | Capacitor | 0.1 μf |
| 312 | Resistor | 1 KΩ |
| 314 | Resistor | 5.11 KΩ |
| 316 | Variable Resistor | 1 KΩ |
| 318 | Resistor | 2 KΩ |
| 320 | Transistor Pair | MD-918 A |
| 322 | Resistor | 2 KΩ |
| 324, 326 | Resistors | 499 Ω |
| 328 | Resistor | 10 KΩ |
| 330 | Resistor | 1 KΩ |
| 332 | Capacitor | 0.1 μf |
| 334 | Resistor | 10 KΩ |
| 336 | Resistor | 3 KΩ |
| 338 | Resistor | 5.11 KΩ |
| 340 | Transistor Pair | M-998 A |
| 342 | Transistor | 2 N-929 |
| 344, 346 | Resistors | 5.11 KΩ |
| 348 | Resistor | 1 KΩ |
| 350 | Transistor Pair | MD-918 A |
| 352 | Resistor | 4 KΩ |
| 354 | Resistor | 2 KΩ |
| 356 | Resistor | 1 KΩ |
| 358 | Transistor | 1 N-2222 |
| 360 | Resistor | 2 KΩ |
| 362 | Transistor | 2 N-2222 |
| 364 | Resistor | 2 KΩ |
| 410 | Capacitor | 0.1 μf |
| 412 | Resistor | 5.11 KΩ |
| 414 | Transistor Pair | MD-918A |
| 416 | Transistor | 2 N-929 |
| 418 | Variable Resistor | 10 KΩ |
| 420 | Resistor | 5.11 KΩ |
| 422 | Resistor | 2 KΩ |
| 424 | Resistor | 5.11 KΩ |
| 426 | Capacitor | 1 μf |
| 428 | Transistor | 2 N-929 |

-Continued

| SYMBOL | COMPONENTS | TYPE OR VALUE |
|---|---|---|
| 430 | Resistor | 1 KΩ |
| 432 | Resistor | 5.11 KΩ |
| 510, 514, 538, 544 | Capacitors | 0.1 μf |
| 512, 540 | Resistors | 5.11 KΩ |
| 516, 542 | Resistors | 2 KΩ |
| 518, 548 | Resistors | 3 KΩ |
| 520 | Transistor Pair | MD-5000 |
| 522, 552 | Resistors | 2 KΩ |
| 524, 554 | Resistors | 2 KΩ |
| 526, 550 | Resistors | 10 KΩ |
| 528 | Transistors | 2 N-2907 |
| 530, 556 | Resistors | 121 Ω |
| 532, 558 | Capacitors | 0.1 μf |
| 534, 562, 536, 564 | Resistors | 2 KΩ |
| 546 | Transistors Pair | MD-918A |
| 566 | Capacitor | 0.001 μf |
| 568 | Field Effect Transistor | 2 N-2609 |
| 570 | Resistor | 121 Ω |
| 572 | Transistor | 2 N-2907 |
| 574 | Resistors | 3.9 KΩ |
| 576 | Resistors | 2 KΩ |
| 578 | Resistors | 20 KΩ |
| 580 | Transistor | 2 N-929 |

The schematic examples of an operative embodiment, given above, will now be discussed.

Figure 3:
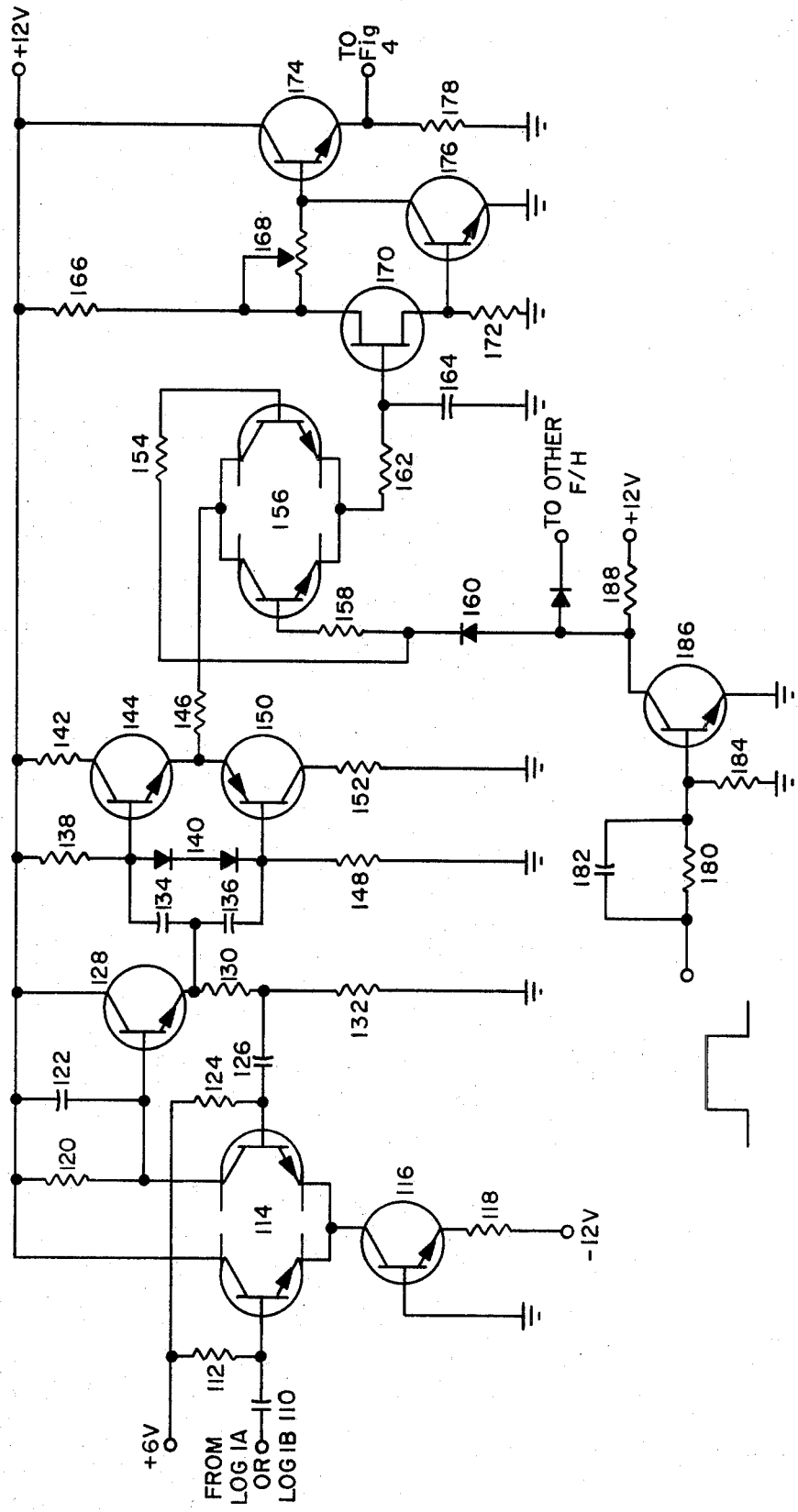
FIG. 3 is a schematic diagram showing an example of embodiment of an operative follow/hold circuit of the present invention.

FIG. 3 shows one of the two follow/hold circuits 20 and 22, the other being identical. As mentioned above, the follow/hold circuit essentially stretches the log amplified output, thereby, permitting the track loop 26 to process what would otherwise be very short RF input pulses.

The logarithmically amplified pulses are coupled to the differential amplifier made up of transistor pair 114 and associated electronics which acts to isolate the input from its output. The output is coupled through transistors 128 to the amplifier composed of transistors 144 and 150, and their associated electronics. The output at this point is a faithful reproduction of the amplitude of the log amplified pulse. The amplitude is coupled to the remainder of the circuits and provided as the follow/hold output only during the periods transistor 186 is triggered "on" by the gating signal applied to its base. As a result, the amount of pulse stretching that occurs is controlled by the gate signal applied to transistor 186.

Figure 4:
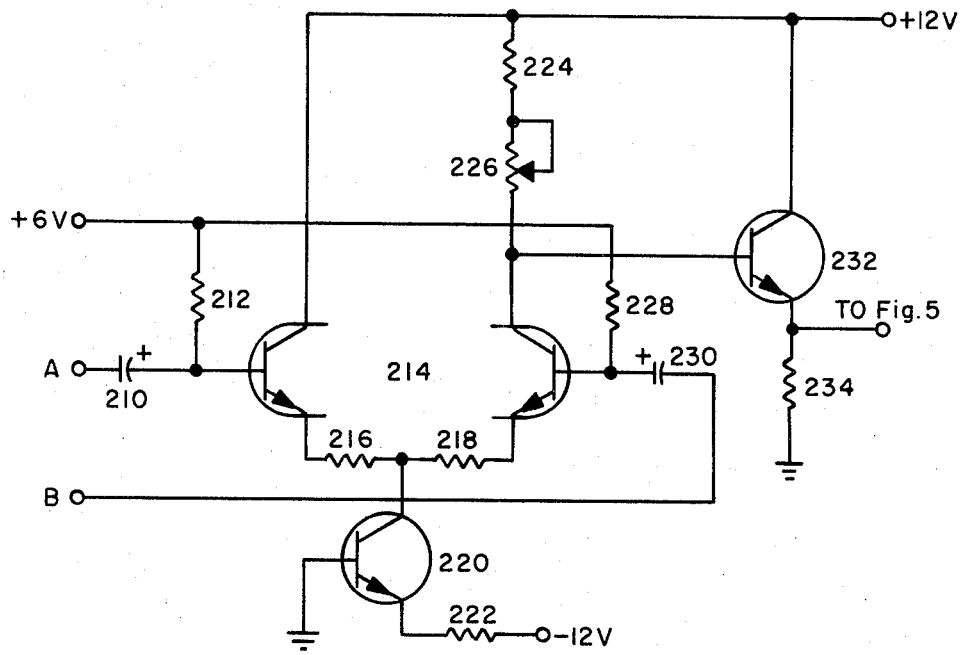
FIG. 4 is a schematic diagram of an example of an operative embodiment of the differencing amplifier of the present invention.
Figure 6:
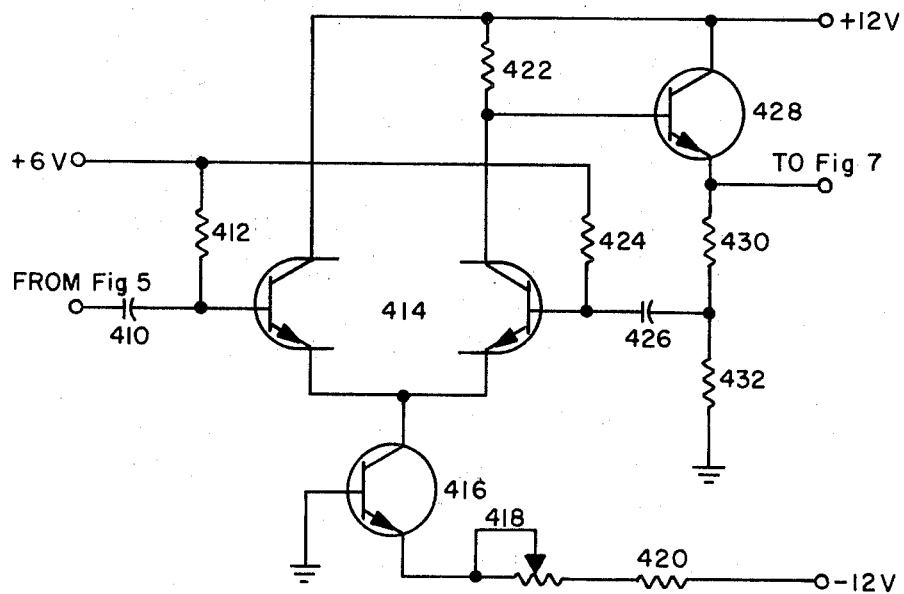
FIG. 6 is a schematic diagram of an example of an operative embodiment of the limiting amplifier of the present invention; and, FIG. 7 is a schematic diagram of an example of an operative embodiment of the gated high speed, zero offset integrator of the present invention.

FIG. 4 shows differencing amplifier 24 and includes differential amplifier 214 having inputs A from follow/hold 20, and B from follow/hold 22. The differential output is coupled through transistor 232 to video track loop 26.

Figure 5:
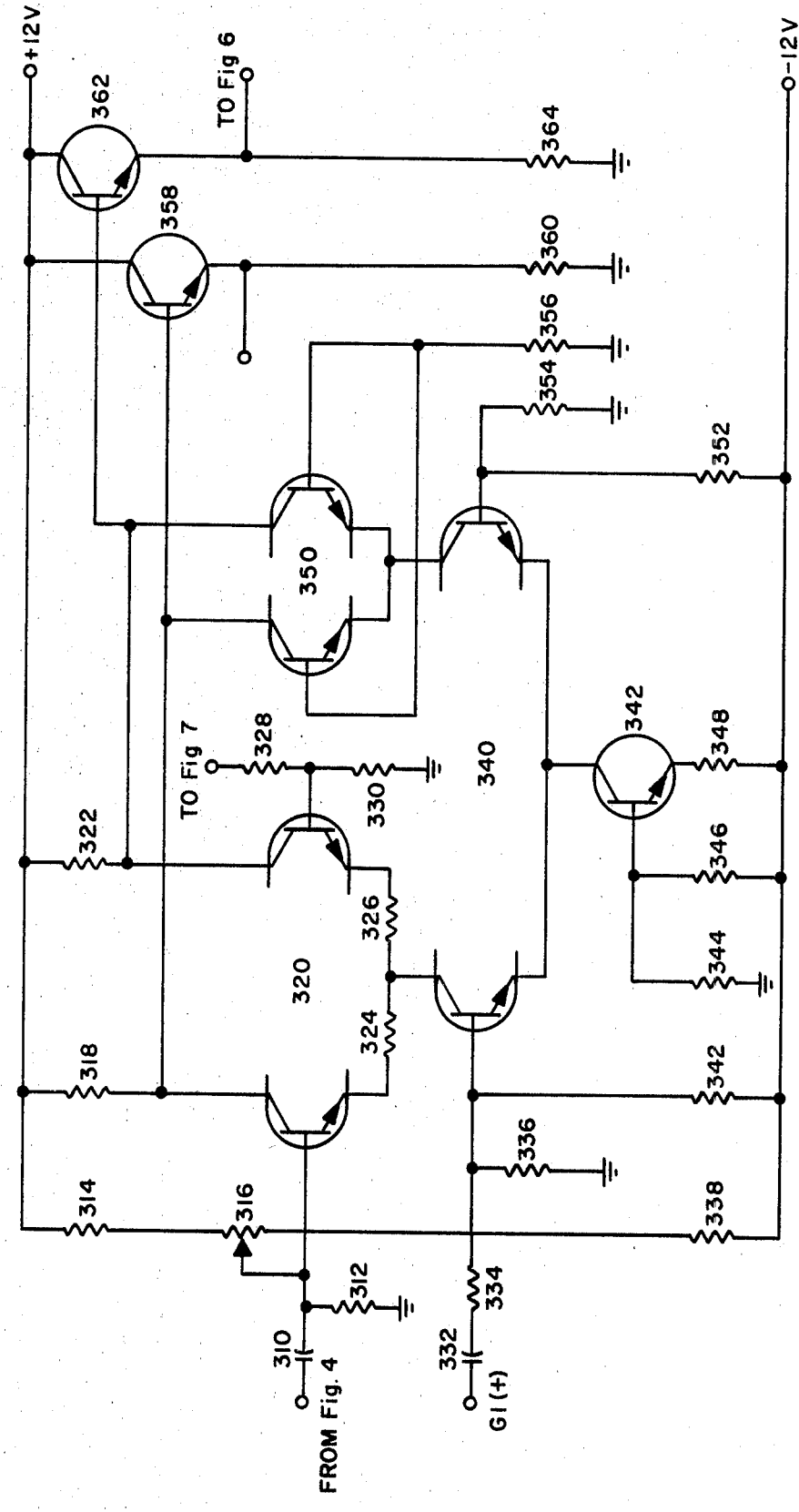
FIG. 5 is a schematic diagram of an example of an operative embodiment of the gated comparator of the present invention.

FIG. 5 shows the gated comparator of track loop 26 wherein the log difference signal is coupled to a matched pair of differential amplifiers controlled by gating signal G. The comparator provides an output dependent on the amplitude and pularity of its log difference input and DC output of gated integrator 35 coupled to the first of the matched differential amplifiers. The comparator provides an output only during the time it is enabled by the external gate pulse G. The output of gated comparator 30 is coupled through optional limiting amplifier 32, shown in FIG. 6 to gated integrator 34. Limiting amplifier 32 is used, if at all, to slow the loop procession down, which slow down may be accomplished in the example shown by adjusting resistor 418.

Figure 7:
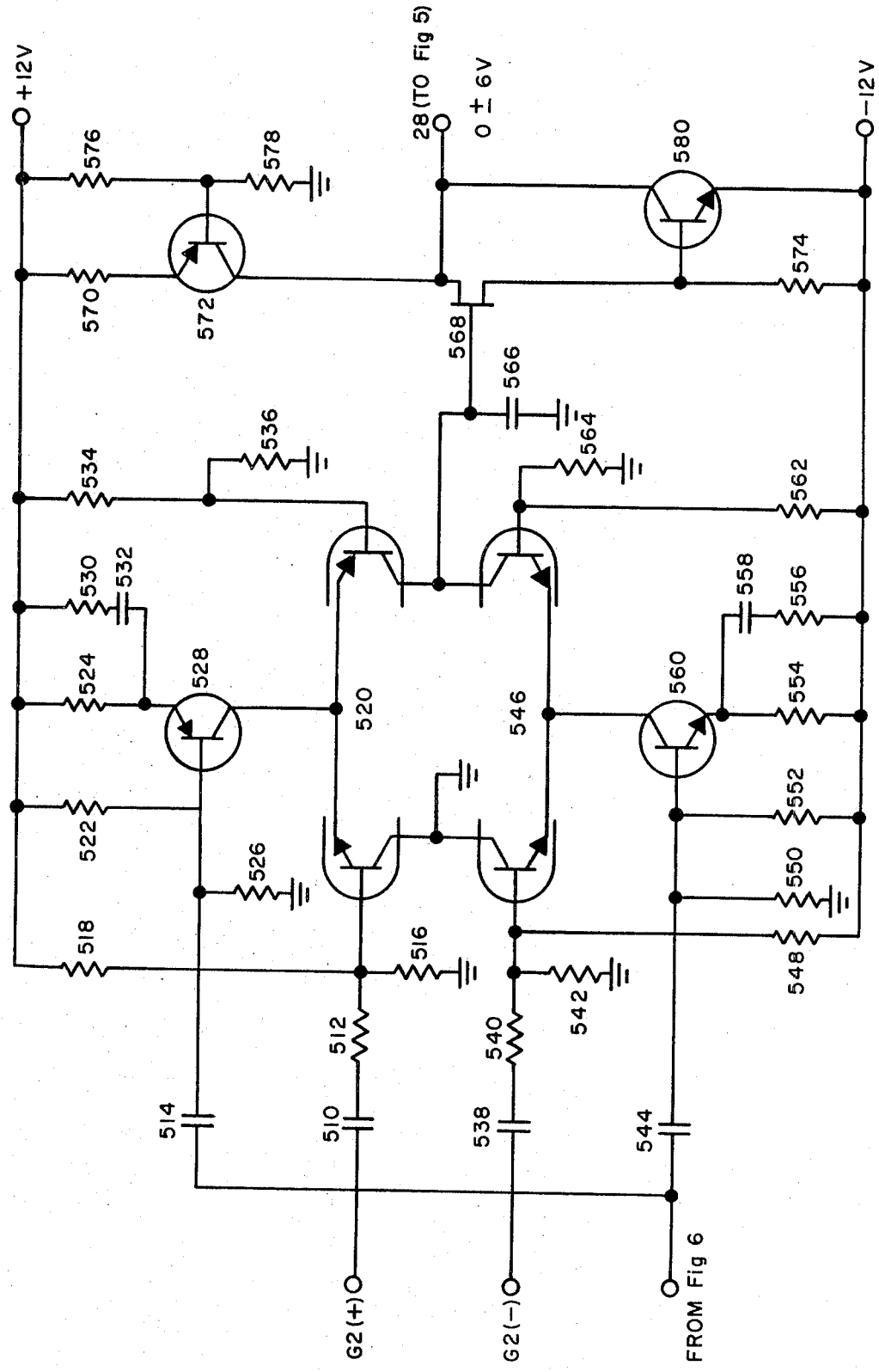

FIG. 7 shows gated integrator 34 which is disclosed and described in the above-identified, related application. The integrator provides an output only during the periods it is gated by the remotely controlled gating signal G. During those periods, a DC output is provided in response to the integration performed by the circuit on the output of gated comparator 30. The DC output is provided as the systems output 28, and is fed back to comparator 30 for comparison with the log difference pulse also coupled to comparator 30.

The advantage of the present invention is that it employs a basic, simple technique. And, it is the only known approach for obtaining high speed tracking of a varing amplitude video pulse with the accuracy required by modern technology.

What is claimed is:

1. A monopulse, direction finding system, comprising:
   means for receiving radar frequency information and converting said information into first and second electrical pulses wherein said first pulse appears in the sum channel, and the second pulse appears in the difference channel, of said monopulse system;
   means coupled to said receiving and converting means for logarithmically amplifying said electrical pulses;
   means coupled to said amplifying means for combining said logarithmically amplified pulses;
   means coupled to said combining means for comparing the combination to a variable voltage level;
   means coupled to said comparing means for averaging the result of said comparison in time and providing the system output, which output is fed back to said comparing means as said variable voltage level; and
   electrical pulse providing means coupled to said comparing means and said averaging means for selectively gating both said means simultaneously.

2. The system of claim 1 wherein said comparing means is an electronic circuit having a first input coupled to said amplifying means and a second input coupled to said gating means, and includes at least one differential amplifier gated by said gating means, wherein an output is provided by said comparing means only during the period an electrical gating pulse is provided by said gating means.

3. The system of claim 2 wherein said averaging means is an electronic integrator that provides an output only during the period an electrical gating pulse is provided by said gating means, which period is the same period an electrical gating pulse is provided to said comparing means.

4. The system of claim 3 wherein an electronic clipper circuit couples said comparing means to said averaging means, and operates to selectively vary the response speed of the circuit loop made up of said comparing and averaging means by controlling the maximum amplitude value of the pulses coupled from said comparing means to said averaging means.

5. The system of claim 4 wherein said integrator has zero offset and includes double differential amplifiers.

6. The system of claim 5 wherein said receiving and converting means has a plurality of channels, and each said channel includes a logarithmic amplifier and a follow/hold circuit for stretching said pulses; and said system further includes a differencing amplifier coupled to each said channel for comparing the outputs of said channels and providing an output of the difference.

7. The system of claim 6 wherein said comparing means is directly connected to the output of said differencing amplifier.

* * * * *